(12) United States Patent
Leonard et al.

(10) Patent No.: US 9,083,439 B2
(45) Date of Patent: Jul. 14, 2015

(54) DIRECT CURRENT SIGNAL TRANSMISSION SYSTEM

(71) Applicant: The Boeing Company, Chicago, IL (US)

(72) Inventors: James V. Leonard, St. Charles, MO (US); Aaron Lee Eggemeyer, Chester, IL (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 13/945,242

(22) Filed: Jul. 18, 2013

(65) Prior Publication Data
US 2015/0023399 A1    Jan. 22, 2015

(51) Int. Cl.
  *H04B 1/3822* (2015.01)
  *H04B 1/40* (2015.01)
  *H04B 3/54* (2006.01)

(52) U.S. Cl.
  CPC ............... *H04B 1/3822* (2013.01); *H04B 1/40* (2013.01); *H04B 3/54* (2013.01)

(58) Field of Classification Search
  CPC .................................................. H04B 1/3822
  USPC .................................................. 375/222, 219
  See application file for complete search history.

(56) References Cited

U.S. PATENT DOCUMENTS

| | | | |
|---|---|---|---|
| 6,995,658 B2 | 2/2006 | Tustison et al. | |
| 2003/0174156 A1* | 9/2003 | Katsuhara et al. | 345/700 |
| 2006/0269001 A1 | 11/2006 | Dawson et al. | |
| 2008/0123868 A1 | 5/2008 | McCarty et al. | |
| 2012/0257680 A1* | 10/2012 | Dickens et al. | 375/240.25 |
| 2014/0049099 A1* | 2/2014 | Sampigethaya et al. | 307/1 |

FOREIGN PATENT DOCUMENTS

| | | |
|---|---|---|
| EP | 0231422 B1 | 8/1992 |
| EP | 0420289 B1 | 12/1995 |

OTHER PUBLICATIONS

Extended European Search Report, dated Jan. 16, 2015, regarding Application No. EP14176411.8, 6 pages.

* cited by examiner

*Primary Examiner* — Michael Neff
(74) *Attorney, Agent, or Firm* — Yee & Associates, P.C.

(57) ABSTRACT

A method and apparatus for sending data. Input signals from input wires are received. The input signals include data. Information about the input signals is identified. The data and the information are sent in digital signals over a wire to a second location. The input signals are recreated from the data and the information received in the digital signals over the wire.

17 Claims, 4 Drawing Sheets

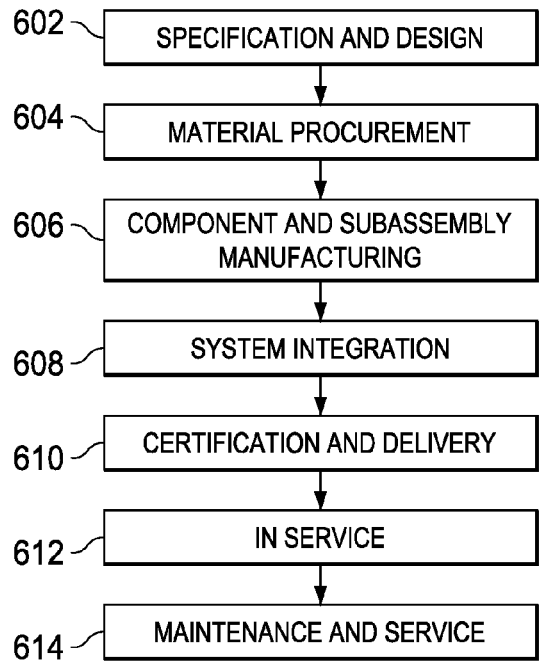
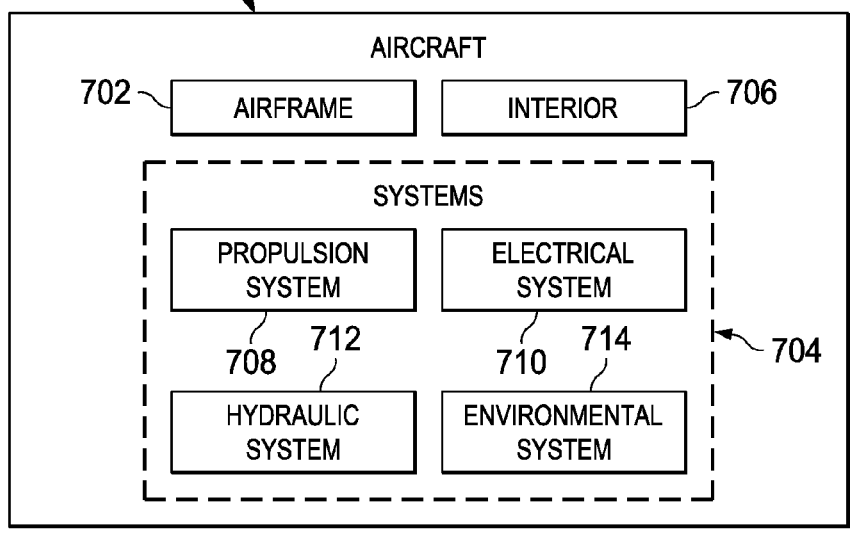

DIRECT CURRENT SIGNAL TRANSMISSION SYSTEM

BACKGROUND INFORMATION

1. Field

The present disclosure relates generally to aircraft and, in particular, to wiring systems in aircraft. Still more particularly, the present disclosure relates to a method and apparatus for transmitting information in signals over a wiring system in an aircraft.

2. Background

Aircraft are complex vehicles that include many different types of components. For example, the avionics in an aircraft may include flight instruments, flight controls, navigation, an engine indicating and crew alerting system, an environmental system, a collision avoidance system, a radar system, sensors, and other suitable components.

These different components are connected to each other through a wiring system and exchange information over the wiring system. This information is exchanged for use in operating aircraft. In particular, signals may be transmitted over a wireless system to exchange information. This type of wiring system may include a network or other suitable types of wiring architectures.

The wiring in an aircraft may be of considerable length and weight within an aircraft. For example, wires may extend from one end of the fuselage to another end of the fuselage of an aircraft to connect components to each other. Further, as the number of components increases, the number of wires also increases in the wiring system to provide connections to the components for exchanging information.

Therefore, it would be desirable to have a method and apparatus that take into account at least some of the issues discussed above, as well as other possible issues.

SUMMARY

In one illustrative example, an apparatus comprises a transmitter and a receiver. The transmitter is configured to receive input signals from input wires. The input signals include data. The transmitter is configured to identify information about the input signals. The transmitter is further configured to send the data and the information in digital signals over a wire. The receiver is configured to receive the digital signals. The receiver is further configured to recreate the input signals from the data and the information received in the digital signals over the wire.

In another illustrative example, an aircraft data transmission system comprises a wire, a transmitter connected to the wire, and a receiver connected to the wire. The transmitter is configured to receive input signals from input wires. The input signals include data. The transmitter is configured to identify information about the input signals. The transmitter is further configured to send the data and the information in digital signals over the wire. The receiver is configured to receive the digital signals. The receiver is further configured to recreate the input signals from the data and the information received in the digital signals over the wire.

In yet another illustrative example, a method for sending data is provided. Input signals from input wires are received. The input signals include data. Information about the input signals is identified. The data and the information are sent in digital signals over a wire to a second location. The input signals are recreated from the data and the information received in the digital signals over the wire.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of an aircraft manufacturing and service method in the form of a block diagram in accordance with an illustrative embodiment; and FIG. 7 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that the number of wires and the length of wires in a wiring system may be reduced by sending data from multiple components over a single wire. The illustrative embodiments also recognize and take into account that with some components, a network may be used to reduce the mapping wiring the wiring system.

The illustrative embodiments recognize and take into account that some components in an aircraft are connected directly to each other. These components may have connections that are not configured for use on a network. The illustrative embodiments recognize and take into account that multiplexing signal wires from multiple components into a single wire or some smaller number of wires may be used to reduce the number of wires used in a wiring system. These signals are then sent over the single wire and may be recreated at another location. In other words, the signals of a single wire maybe multiplexed and then sent over wires to the destination components.

Thus, the illustrative embodiments provide a method and apparatus for sending data. In one illustrative example, an apparatus comprises a transmitter and a receiver. The transmitter is configured to receive input signals from input wires. The input signals include data. The transmitter is configured to identify information about the input signals and send the data and the information in digital signals over a wire. The receiver is configured to receive the digital signals and recreate the input signals from the data and the information received in the digital signals over the wire.

Figure 1:
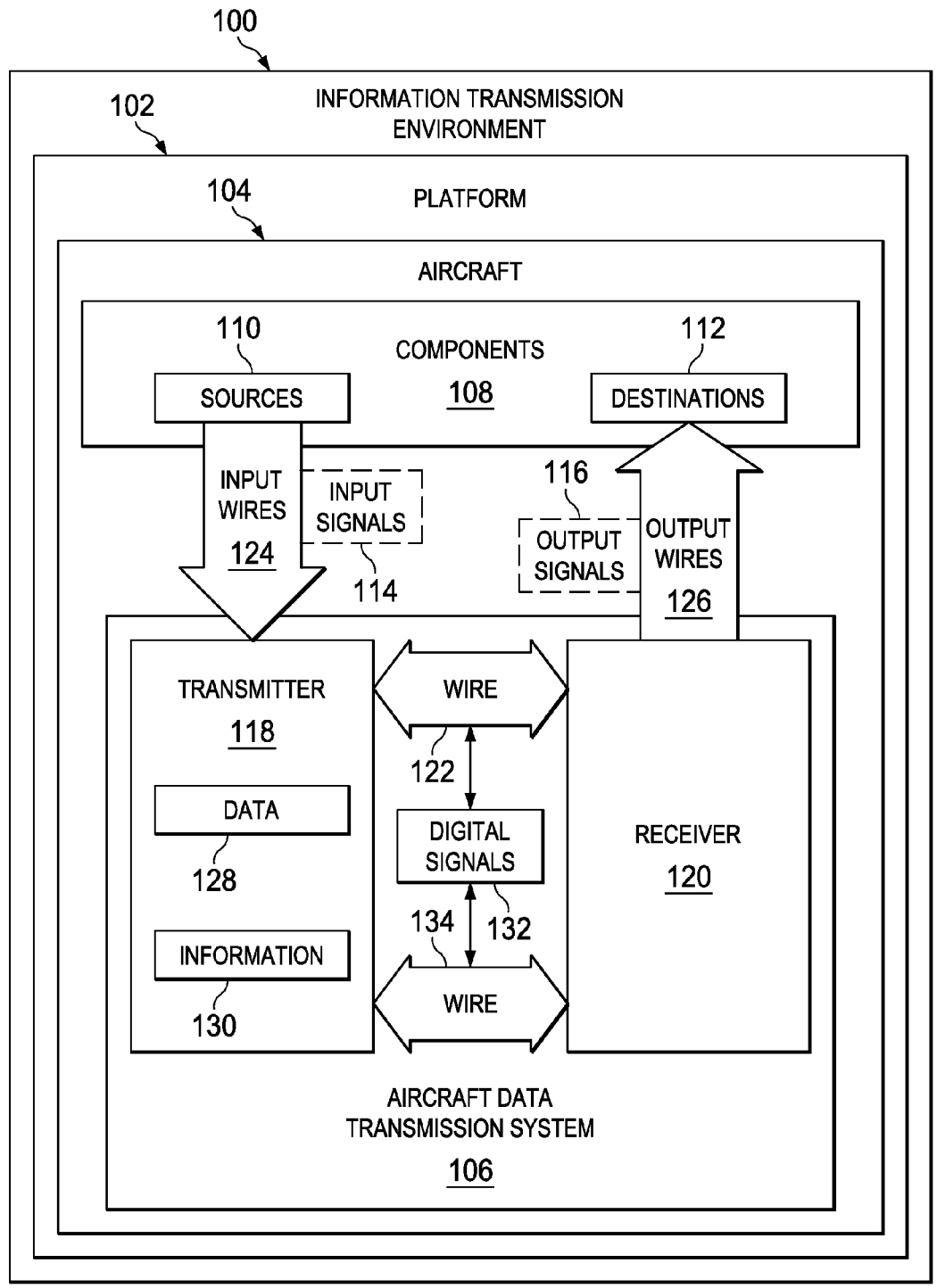
FIG. 1 is an information transmission environment in the form of a block diagram in accordance with an illustrative embodiment.

With reference now to figures and, in particular, with reference to FIG. 1, an information transmission environment in the form of a block diagram is depicted in accordance with an illustrative embodiment. In this illustrative example, information transmission environment 100 includes platform 102. In this particular example, platform 102 takes the form of aircraft 104.

In this illustrative example, aircraft data transmission system 106 connects components 108 to each other in aircraft 104. As depicted, components 108 include sources 110 and destinations 112 for the transmission of signals. In the illustrative example, sources 110 send signals to destinations 112.

In the illustrative example, a source in sources 110 may be any component in aircraft 104 that is configured to send input signals 114 to aircraft data transmission system 106. A destination in destinations 112 may be any component in aircraft 104 that is configured to receive output signals 116 sent by aircraft data transmission system 106. As depicted, a component may be both a source and a destination in the illustrative examples. For example, a component in components 108 may be a computer, a display device, a sensor system, an environmental control system, a navigation system, a line replaceable unit, an actuator, or some other suitable type of components.

In this illustrative example, aircraft data transmission system 106 includes a number of different components. As depicted, aircraft data transmission system 106 includes transmitter 118, receiver 120, wire 122, input wires 124, and output wires 126.

As used in the illustrative examples, a wire is configured to carry electrical signals. Additionally, the wire also may include a protective jacket or cover. In some cases, wires may be bundled together in a cable or wiring harness.

As depicted, input wires 124 are connected to transmitter 118 and sources 110. In particular, input wires 124 may be connected to sources selected from at least one of a computer, a display device, a sensor system, an environmental control system, a navigation system, a line replaceable unit, an actuator, or other sources. Output wires 126 are connected to receiver 120 and destinations 112. Wire 122 connects transmitter 118 and receiver 120 to each other.

As depicted, transmitter 118 is configured to receive input signals 114 from sources 110 in components 108. In these illustrative examples, input signals 114 include data 128. For example, input signals 114 may encode data 128. The encoding of data 128 may be performed using any encoding technique available for encoding data 128 into input signals 114. Further, in the illustrative examples, input signals 114 may be analog signals.

Transmitter 118 is also configured to identify information 130 about input signals 114. For example, information 130 may describe characteristics of input signals 114 of parts from data 128 carried in input signals 114.

In this illustrative example, transmitter 118 is configured to send both data 128 and information 130 to receiver 120. In this depicted example, data 128 and information 130 are sent to receiver 120 over wire 122 as digital signals 132. As depicted, digital signals 132 are direct current digital signals. Thus, input signals 114 may be multiplexed into digital signals 132 over wire 122.

Further, receiver 120 is configured to receive digital signals 132. As depicted, receiver 120 is configured to recreate input signals 114 from data 128 and information 130 in digital signals 132. In the illustrative example, receiver 120 is configured to send the recreation of input signals 114 over output wires 126 as output signals 116.

Further, for purposes of redundancy, wire 134 also may connect transmitter 118 and receiver 120 to each other. In this case, wire 122 is a first wire and wire 134 is a second wire. These two wires provide redundancy in case of an issue in transmission over one of the wires due to environmental effects or inconsistencies in one of the wires. Wire 122, wire 134, input wires 124, output wires 126, and other wires may be part of the wiring system in aircraft data transmission system 106.

In this illustrative example, transmitter 118 is configured to send data 128 and information 130 in digital signals 132 over wire 122 and wire 134. Receiver 120 is configured to receive digital signals 132 over wire 122 and wire 134. Receiver 120 is configured to recreate input signals 114 from data 128 and information 130 received over at least one of wire 122 and wire 134.

The illustration of information transmission environment 100 and the different components in this environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to aircraft 104, an illustrative embodiment may be applied to other types of platforms. Platform 102 may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

As another illustrative example, the blocks representing input wires 124 and output wires 126 have been described with respect to the flow of the signals. A physical implementation may include a wire that functions as both an input wire and output wire. In some illustrative examples, signals may be bidirectional. In this type of implementation, a router or other type of device may be connected to transmitter 118 and receiver 120 such that a physical wire may be used to both receive and transmit input signals 114.

Figure 2:
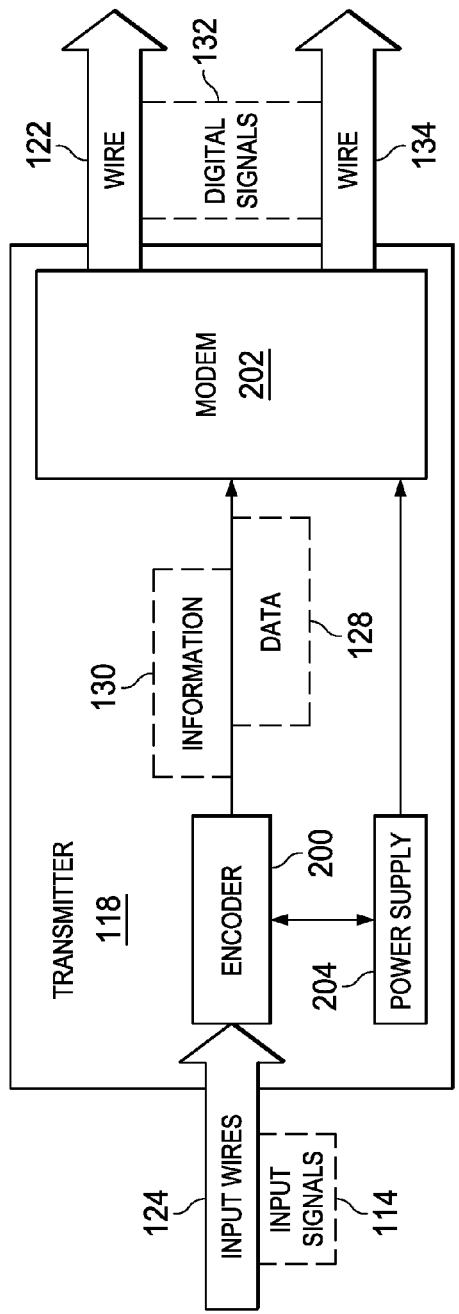
FIG. 2 is an illustration of a transmitter in accordance with an illustrative embodiment.

With reference next to FIG. 2, an illustration of a transmitter is depicted in accordance with an illustrative embodiment. In the depicted example, an illustration of an implementation for transmitter 118 is shown.

In this illustrative example, transmitter 118 includes a number of different components. As depicted, transmitter 118 includes encoder 200, modem 202, and power supply 204.

Encoder 200 is configured to be connected to input wires 124 and receive input signals 114 from input wires 124 in FIG. 1. Encoder 200 is configured to identify data 128 and information 130. Encoder 200 is configured to send data 128 and information 130 to modem 202 for transmission.

In these illustrative examples, data 128 may be identified based on the encoding scheme used to encode data 128 in input signals 114. For example, pulse code modulation (PCM) may be used to encode data 128 in input signals 114 received by encoder 200 and transmitter 118.

Modem 202 is connected to at least one of wire 122 or wire 134. Modem 202 is configured to encode data 128 and information 130 into digital signals 132 for transmission over wire 122.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In this illustrative example, power supply 204 is configured to supply power to the different components in transmitter 118. For example, power supply 204 may be connected to an alternating current power source and convert the alternating current into a direct current for use by encoder 200 and modem 202.

Figure 3:
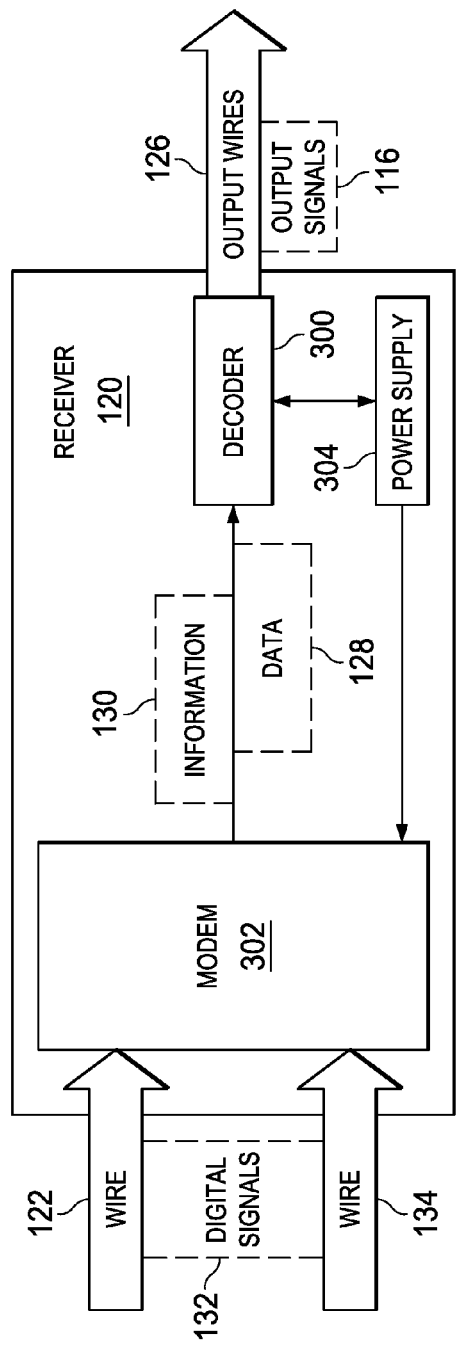
FIG. 3 is an illustration of a receiver in accordance with an illustrative embodiment.

With reference now to FIG. 3, an illustration of a receiver is depicted in accordance with an illustrative embodiment. In the depicted example, an illustration of an implementation for receiver 120 is shown.

In this illustrative example, receiver 120 includes a number of different components. As depicted, receiver 120 includes decoder 300, modem 302, and power supply 304. Of course, receiver 120 may also include other components in addition to or in place of the ones depicted.

Modem 302 is connected to at least one of wire 122 or wire 134. Modem 302 is configured to receive digital signals 132 and decode these signals. The decoding of these signals identifies data 128 and information 130 carried in digital signals 132. In other words, modem 302 is configured to extract data 128 and information 130 from digital signals 132.

In this illustrative example, decoder 300 is configured to identify data 128 and information 130 received in digital signals 132 over wire 122, wire 134, or both. Additionally, decoder 300 is configured to recreate input signals 114 in FIG. 1 using data 128 and information 130. The recreation of the input signals 114 may then be sent as output signals 116 on output wires 126.

In these illustrative examples, the use of information 130 makes the recreation of input signals 114 possible. Information 130 describes characteristics of input signals 114 in a manner that allows for the recreation of input signals 114 with data 128.

Power supply 304 is configured to supply power to the different components in receiver 120. For example, power supply 304 provides power to decoder 300, modem 302, and other suitable components.

Illustrations of implementations for transmitter 118 and receiver 120 in FIGS. 2 and 3 are only meant as examples and not meant to limit the manner in which the illustrative embodiments may be implemented. For example, transmitter 118 and receiver 120 may include other components in addition to or in place the ones depicted. As another example, transmitter 118 and receiver 120 may include filters, amplifiers, or other suitable components. Further, transmitter 118 and receiver 120 may be located in devices such as a switch, a router, or other components to provide additional functionality for those devices.

Figure 4:
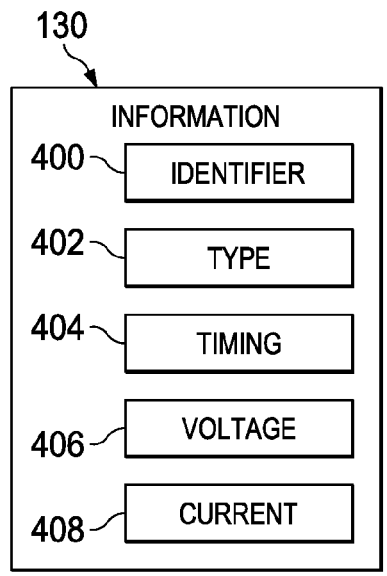
FIG. 4 is an illustration of information in the form of a block diagram in accordance with an illustrative embodiment.

Turning now to FIG. 4, an illustration of information in the form of a block diagram is depicted in accordance with an illustrative embodiment. Examples of types of information that may be included in information 130 in FIG. 1 are shown.

As depicted, information 130 is information about input signals 114. Information 130 may be the same for all of input signals 114 if all of input signals 114 have the same characteristics.

In this illustrative example, information 130 may include at least one of identifier 400, type 402, timing 404, voltage 406, current 408, or other suitable types of information that may be used to recreate input signals 114. In other words, information 130 may be used to generate signals that match input signals 114. In other words, different characteristics of input signals 114 may be the same such that the signals generated are substantially the same as input signals 114.

In this illustrative example, identifier 400 may identify a source of input signals 114. For example, identifier 400 may be a port number, a cable identifier, an Internet protocol address, or some other suitable type of identifier.

As depicted, type 402 may identify a type of signaling used to send the number of input signals. Type 402 may also identify one or more of a bit rate for data sent over the number of input signals, a class of data for the data sent over the number of input signals, or other suitable information for describing the number of input signals.

For example, type 402 may identify input signals 114 as a class of data selected from one or more of audio data, video data, and control data. As another example, type 402 may identify input signals 114 as a type of signaling selected from at least one of analog signals, pulse-code modulation signals, or other suitable types of signaling used to send data over cables.

As depicted, timing 404 identifies the timing of input signals 114. For example, timing 404 may include a period of time or each input signal in input signals 114. In other illustrative examples, timing 404 may provide a time at which a particular signal was sent or other suitable types of timing information.

In the illustrative example, voltage 406 identifies a voltage level for input signals 114. In other words, if different input signals have different voltages, voltage 406 may identify that voltage level for each of the input signals.

For example, voltage 406 may identify a maximum upper voltage and a maximum lower voltage for each of input signals 114. As another example, voltage 406 also may identify at least one of an average voltage of input signals 114, a peak voltage, a voltage range, or any other suitable description for a voltage for each of input signals 114.

Current 408 identifies the current in input signals 114. For example, current 408 may identify current level for input signals 114. Current 408 may identify at least one of a current level, an average current level, a peak current, a range of current levels for a number of input signals, or any other suitable description for current flow. Current 408 describes this information for each of input signals 114.

The illustration of information 130 is only provided as one example of what may be present in information 130. The information actually included in information 130 may depend on the particular implementation. These examples are not meant to limit the types of information or how much information is present in information 130. For example, in some cases, information 130 may be present for some of input signals 114 instead of all of input signals 114.

Figure 5:
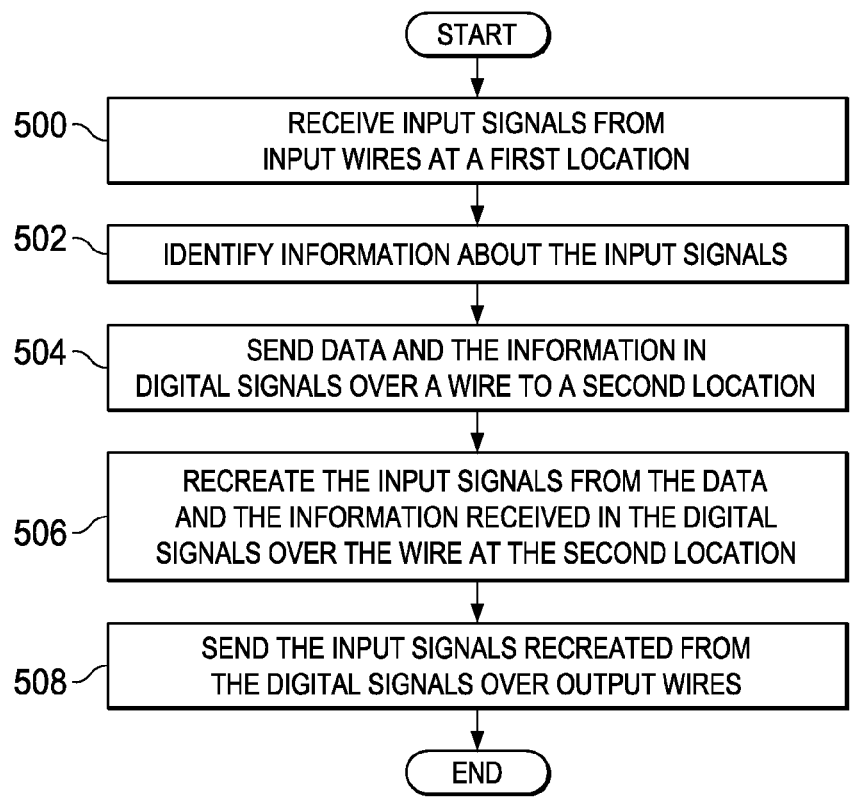
FIG. 5 is a process for sending data in the form of a flowchart in accordance with an illustrative embodiment.

Turning next to FIG. 5, a process for sending data in the form of a flowchart is depicted in accordance with an illustrative embodiment. The process illustrated in FIG. 5 may be implemented in information transmission environment 100 in FIG. 1. In particular, the process may be implemented using one or more components in aircraft data transmission system 106 in FIG. 1.

The process begins by receiving input signals from input wires at a first location (operation 500). The input signals include data. In the illustrative example, the data may be encoded in waveform for the input signals. Next, the process identifies information about the input signals (operation 502). The data and the information in digital signals are sent over a wire to a second location (operation 504).

The process recreates the input signals from the data and the information received in the digital signals over the wire at the second location (operation 506). The input signals recreated from the digital signals are sent over output wires (operation 508), with the process terminating thereafter. In operation 508, the input signals that are recreated form output signals.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured picking up my or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in the form of a block diagram in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance or service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in the form of a block diagram in which an illustrative embodiment may be implemented. In this example, aircraft 700 is produced by aircraft manufacturing and service method 600 in FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6.

In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. For example, wiring systems such as those used in an aircraft data transmission system may be manufactured and implemented in aircraft 700 during these different stages.

One or more apparatus embodiments, method embodiments, or a combination thereof may be utilized while aircraft 700 is in service 612 and/or during maintenance and service 614 in FIG. 6. For example, an aircraft data transmission system in accordance with an illustrative embodiment may be used to replace or supplement the existing wiring systems in aircraft 700 during maintenance and service 614. The use of an aircraft data transmission system implemented in accordance with an illustrative embodiment during in service 612 may result in greater range, better fuel economy, and other results from a reduction in weight using the aircraft data transmission system.

These changes to aircraft 700 may be made during normal maintenance, refurbishment, upgrades, and other operations that may be performed during maintenance and service 614. Thus, the different illustrative embodiments may substantially expedite the assembly of and/or reduce the cost of aircraft 700.

Thus, one or more illustrative embodiments may be used to reduce the weight of systems such as aircraft data transmission system 106 in FIG. 1. In the illustrative example, the weight of wires, number of wires, or both, in a platform such as aircraft 104 in FIG. 1 may be reduced. The reduction weight may occur through the multiplexed signals received over wires and sending the multiplexed signals into a lower number of wires at a first location. These signals may then be reproduced at a second location and the reproduced signals may be sent to their destinations.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a transmitter configured to:
receive input signals from input wires, such that the input signals comprise data;
identify information about the input signals; and
send the data and the information in digital signals over a wire, such that the transmitter comprises:
an encoder configured to receive the input signals from the input wires and identify the information about the input signals; and
a modem configured to send the data and the information in the digital signals over the wire; and
a receiver configured to receive the digital signals and recreate the input signals from the data and the information received in the digital signals over the wire.

2. The apparatus of claim 1, wherein the wire is a first wire and wherein the transmitter is configured to send the data and the information in the digital signals over the first wire and a second wire for redundancy.

3. The apparatus of claim 2, wherein the receiver is configured to recreate the input signals from the data and the information received in the digital signals received over at least one of the first wire and the second wire.

4. The apparatus of claim 1, wherein the input signals from the input wires are multiplexed into the digital signals sent over the wire.

5. The apparatus of claim 1, wherein the input signals are analog signals.

6. The apparatus of claim 1, wherein the digital signals are direct current digital signals.

7. The apparatus of claim 1, wherein the receiver comprises:
a modem configured to receive the digital signals sent over the wire; and
a decoder configured to identify the data and the information from the digital signals and recreate the input signals from the data and the information received in the digital signals over the wire.

8. The apparatus of claim 1, wherein the information is selected from at least one of an identifier, a type of information suitable for describing the input signals, a timing, a voltage, or a current.

9. The apparatus of claim 1, wherein the transmitter and the receiver are physically associated with a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

10. An aircraft data transmission system comprising:
a wire;
a transmitter connected to the wire and configured to receive input signals from input wires, wherein the input signals include data; identify information about the input signals; and send the data and the information in digital signals over the wire, such that the wire is a first wire and wherein the transmitter is configured to send the data and the information in the digital signals over the first wire and a second wire for redundancy; and
a receiver connected to the wire and configured to receive the digital signals and recreate the input signals from the data and the information received in the digital signals over the wire.

11. The aircraft data transmission system of claim 10, wherein the receiver is configured to recreate the input signals from the data and the information received in the digital signals received over at least one of the first wire and the second wire.

12. The aircraft data transmission system of claim 10, wherein the input wires are connected to at least one of a computer, a line replaceable unit, a sensor system, an environmental control system, or a navigation system.

13. The aircraft data transmission system of claim 10, wherein the information is selected from at least one of an identifier, a type of information suitable for describing the input signals, a timing, a voltage, or a current.

14. A method for sending data, the method comprising:
receiving input signals from input wires, such that the input signals comprise analog signals comprising data;
identifying information about the input signals;
sending the data and the information in digital signals over a wire to a second location, such that the digital signal comprise direct current signals; and
recreating the input signals from the data and the information received in the digital signals over the wire.

15. The method of claim 14 further comprising:
sending the input signals recreated from the digital signals over output wires.

16. The method of claim 14, wherein the wire is a first wire further comprising:
sending the data and the information in the digital signals over a second wire for redundancy.

17. The method of claim 14, wherein the information is selected from at least one of an identifier, a type of information suitable for describing the input signals, a timing, a voltage, or a current.

* * * * *